Figure 1:
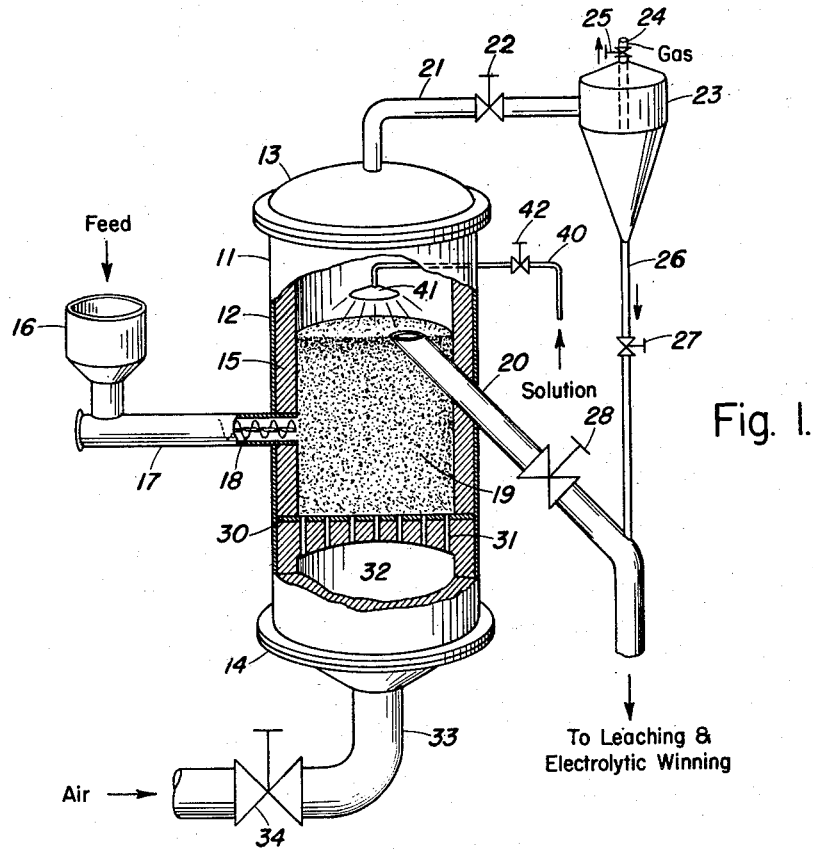

Feb. 26, 1957     R. M. FOLEY     2,783,141
METHOD OF TREATING COPPER ORE CONCENTRATES
Filed June 10, 1953     2 Sheets-Sheet 1

Fig. I.

INVENTOR
Rupert M. Foley
BY
ATTORNEY

Feb. 26, 1957 R. M. FOLEY 2,783,141
METHOD OF TREATING COPPER ORE CONCENTRATES
Filed June 10, 1953 2 Sheets-Sheet 2

INVENTOR
Rupert M. Foley
BY William J. Fox
ATTORNEY

United States Patent Office 2,783,141
Patented Feb. 26, 1957

2,783,141

METHOD OF TREATING COPPER ORE CONCENTRATES

Rupert M. Foley, Westport, Conn., assignor to Dorr-Oliver Incorporated, a corporation of Delaware Application June 10, 1953, Serial No. 360,637

2 Claims. (Cl. 75—26)

This invention relates to the selective roasting of ores or concentrates containing copper compounds in association with sulfidic materials. It is particularly adapted for the roasting of sulfidic copper concentrates which also contain combined iron to yield a roasted product rich in soluble copper compounds and low in soluble iron compounds. This permits the subsequent use of leaching methods to separate the copper compounds from residual associated insoluble materials.

This application is a continuation-in-part of my earlier application Serial Number 87,191, filed April 13, 1949, now abandoned, relating to the same general subject matter.

Prior attempts have been made to heat-treat or roast sulfidic bearing metal ores and concentrates and thereby produce a constituent which is soluble in water or dilute acid and a constituent which is insoluble. However, such methods have attained no significant commercial success and in every case were marked with certain difficulties which impeded commercialization. These methods have included heap roasting as well as various forms of roasting in conventional equipment such as muffle-furnaces, multiple-hearth roasters, etc. The difficulties in such prior methods comprise for example, (a) poor yield of soluble product, (b) contamination of the desired metal compound with undesirable materials, (c) complexity of the methods, (d) high capital investment in equipment, (e) lack of uniformity or reproducibility in results achieved, (f) high maintenance and operating expenses, (g) poor efficiency in utilizing any inherent fuel value of the materials treated, (h) excessive time consumed in roasting, and so on.

Some of these prior methods have made use of rotary kilns, etc. and have conducted the roast stagewise with deliberate concurrent flow of gas and solids and deliberate variations in temperature from stage to stage in order to attain maximum sulfating of the copper values of the ore. This method suffers from the obvious disadvantage that several thermally independent zones must be maintained. Moreover, such prior processes lack flexibility because they are limited to the production of a calcine having a given copper sulfate content and are incapable of yielding a calcine having a controlled copper sulfate content.

So it is an object of this invention to overcome such difficulties and provide a sound means of achieving selective roasting to thereby permit efficient separation of the constituents in the roasted product according to predetermined differences in the water and/or acid solubility of the constituents.

More specifically, it is an object of this invention to provide a method whereby a material containing sulfidic copper may be converted to a soluble form of copper while maintaining or converting associated iron present in an insoluble form.

Another object of this invention is to provide a method of varying over a broad range the ratio of water soluble copper product to water-insoluble acid-soluble copper product simultaneously yielded in the bed and thereby permit economic variations in specific leaching practices. That is to say, in electrolytic copper recovery systems where the starting material is predominantly copper sulfate ($CuSO_4$) then a large excess of sulfuric acid ($H_2SO_4$), over that required for the leach, is generated in the electrowinning system following the leach and must be disposed of in some manner. On the other hand, if the starting material is predominantly copper oxide ($CuO$), then great quantities of sulfuric acid must be added in order to put the copper oxide into solution for the subsequent electrowinning of copper. It is evident then, that great economy will be attained by this invention which utilizes the roasting process to balance the electrolytic copper recovery system so that acid will be produced or consumed in accordance with the varient needs of any particular operation. Thus, if there is a ready use for excess sulfuric acid such as dump leaching and the like, then the roast will be conducted in such a manner that the calcine predominates in copper sulfate, whereas if there is no ready use for the sulfuric acid then it will be to the operator's advantage to roast the copper ore so as to yield a calcine low in sulfuric acid and thus avoid the cost and necessity of disposing of excess acid.

Other objects of this invention will appear as this specification proceeds.

I have discovered that the above mentioned difficulties can largely be minimized and the objects attained if said ore or concentrate is finely divided and roasted while in the fluidized state, under conditions as indicated below.

By fluidization is meant that condition wherein finely-divided solids are supported as a single dense turbulently mobilized thermally homogeneous mass of solids exhibiting neither the characteristics of concurrent flow nor the characteristics of countercurrent flow and so is distinct from other processes heretofore utilized in the roasting of copper bearing sulfide ores.

Briefly, this invention revolves about the concept of roasting finely-divided copper-bearing sulfide ores under solids fluidizing conditions and comprises the steps of establishing and maintaining at reaction temperature in an enclosed chamber a bed of finely-divided solids fluidized by the upward passage therethrough of oxygen-bearing treatment gas, feeding to the bed solids to be roasted and there roasting them to yield a calcine containing a desired $CuSO_4/CuO$ ratio by regulating both the reaction temperature and the oxygen content of the uprising gases within critical limits and in relation to each other.

Before describing my discovery further it may be well to define and describe the nature of the fluidized solids state since this is a necessary and material feature of my invention. In such description I do not mean to imply that fluidization of fine solids per se was originated by me but since fluidization of fine solids is not widely understood in many arts, and because the true novelty of my invention is inextricably associated with fluidization, it is advisable to clearly distinguish this aspect of my invention from conventional suspension-roasting, stationary bed roasting, rotary kilns, or combinations thereof heretofore utilized in the art.

By fluidization of fine solids, I mean the dense-suspension of such solids in an upflowing treatment gas stream of specified space velocity whereby the dense-suspension or bed is similar in appearance to a boiling liquid and presents a liquid-like surface level. The outstanding characteristics of fluidization are as follows: (a) the suspension contains a very high concentration of solids per unit volume, (b) the solids therein are in erratic, zig-zag turbulent motion, (c) the suspension behaves substantially like a liquid in its flow qualities and (d) the temperature throughout the suspension is quite uniform i. e. the suspension may be described as thermally homogeneous.

These characteristics are to be contrasted on the one hand with a dense, thermally-heterogeneous fixed or moving bed of solids having gas percolating upwardly therethrough and on the other hand with a typical dilute gas suspension such as dusty air wherein the suspension acts principally like the suspending gas. In this specification, the words fluidization, fluidized and fluidized-solids are used synonymously.

Fluidization of fine solids with concomitant treatment of the solids by the fluidizing gas may be accomplished in several different ways and forms of reactors. A simple type of apparatus is shown in the accompanying Fig. 1 wherein is represented a vertical vessel or reactor lined with refractory material. Internally, a horizontal apertured partition or constriction plate divides the vertical cylindrical reactor into an upper or bed section and a lower gas receiving section or windbox. Conduit means serve to conduct gas under pressure to the windbox section of the reactor, thence up the apertures of the constriction plate at a velocity causing fluidization of the bed of fine solids such as a space velocity of one foot per second. Exiting gas rises through a dust disengaging section (hereinafter referred to as the freeboard) and is conducted to discharge or further treatment from an upper portion of the vessel. Fresh solids to be treated are supplied to the bed from above the surface thereof or at a point above the constriction plate but below the surface level of the bed as shown; treated solids are conducted from the bed by a conduit whose upper or solids entrance end may determine the surface level of the bed.

In roasting a sulfidic copper concentrate while "fluidized" and within certain temperature ranges and air proportions, I found that the copper content of the roasted product was substantially fully in acid-soluble or water-soluble form and combination thereof. This appears to represent a conversion of the copper either to the acid-soluble cupric oxide (CuO) or to the water-soluble cupric sulfate ($CuSO_4$). Significantly, iron present was nearly all maintained in insoluble form, principally as the insoluble ferric oxide ($Fe_2O_3$). In addition, I also found that, by further suitable regulation of the temperature of a single fluidized copper roasting bed, the ratio in the roasted product of water-soluble copper to acid-soluble copper could be varied within a wide range without an appreciable loss in total soluble copper formed. In general, a high roasting temperature favors the formation of acid-soluble rather than water-soluble copper. It may also be generalized that an increased quantity of excess air will result in an increased yield of sulfate. It is important to note, however, that neither the oxygen control feature nor the temperature control feature are independent of each other but are related and at times antagonistic, and each must be exercised in correlation with the other in order to attain the objects of my invention. In some situations the optimum roasting temperatures will be antagonistic to the desired results and therefore regulation of the quantity of excess oxygen is utilized to offset an undesired temperature effect. Thus, if it is desired to yield a calcine high in acid-forming copper ($CuSO_4$) while operating near the upper temperature limit then the temperature effect is offset by increasing the quantity of excess oxygen employed in the roast. Conversely, if small quantities of $CuSO_4$ are desired while operating near the lower temperature limit then excess oxygen is decreased to offset the temperature effect in order to produce the desired calcine.

In still other situations optimum roasting temperatures will tend to favor the desired result and control of the excess oxygen as utilized to augment the temperature effect. Thus, for a low yield of $CuSO_4$ at either a high or a low temperature, the excess oxygen supply is decreased to inhibit the formation of $CuSO_4$ and thus to promote the formation of CuO. In short, control of the excess oxygen amounts to regulating the rate at which free-oxygen is supplied to the bed in correlation to the rate of solids feed to such bed or vice versa so that the amount of oxygen supplied lies in the range from just sufficient to furnish the required theoretical oxygen as hereinafter defined to 400% in excess of such theoretical oxygen.

This control of the calcine composition provides a flexibility in operation and adjustment to satisfy the requirements of different leaching circuits. It is contemplated that, after leaching, the dissolved copper will be changed to metallic form by conventional electrolytic systems or by other known copper-recovery methods. Thereupon a further feature of this invention lies in that spent copper-bearing liquor derived from an electrolytic system or other liquid extraction method may be injected into the hot, roasting bed of fluidized solids and thereby not only serve as a temperature control means for the bed but also will transfer its copper-content to the solids undergoing treatment.

In a broad sense, the control features of my invention involve regulation of the temperature of the roasting fluidized bed and the proportioning of the oxygen in the roaster air supply. Specifically, I determined that a roasting temperature in a fluidized bed below about 550° C. was insufficient to yield large percentages of soluble copper and that temperatures above about 750° C. were marked with a significant diminution in the total soluble copper in the product. The latter phenomenon I surmise to be due to the formation of insoluble compounds of iron and copper, especially ferrites.

Turning now to the other control feature of this invention, which is the proportioning of the oxygen initially present in the roasting and fluidizing gas. Roasting of ores and concentrates are accompanied by complex chemical changes, not all of which are perfectly understood. Thus, for example, when roasting sulfidic copper feed solids, the following reactions may occur:

1. $Cu_2S + 2O_2 \rightarrow 2CuO + SO_2$
2. $2CuFeS_2 + 13/2 O_2 \rightarrow 2CuO + Fe_2O_3 + 4SO_2$
3. $2FeS_2 + 11/2 O_2 \rightarrow Fe_2O_3 + 4SO_2$
4. $CuO + Fe_2O_3 \rightarrow Cu(FeO_2)_2$
5. $Cu(FeO_2)_2 + SO_3 \rightleftharpoons CuSO_4 + Fe_2O_3$
6. $SO_2 + 1/2 O_2 \rightleftharpoons SO_3$
7. $CuO + SO_3 \rightleftharpoons CuSO_4$
8. $Fe_2O_3 + 3SO_3 \rightleftharpoons Fe_2(SO_4)_3$
9. $FeS_2 + 5/2 O_2 \rightarrow FeO + 2SO_2$
10. $2CuSO_4 \rightleftharpoons CuO \cdot CuSO_4 + SO_3$ As shown, some of these reactions are antagonistic and counterbalance others. Thus, there is likelihood of confusion in defining the theoretical or stoichiometric free-oxygen requirements for roasting. To clarify this, I define herein theoretical oxygen (and its air equivalent) as the amount required chemically to oxidize the feed material as follows:

1. All contained sulfur to sulfur dioxide ($SO_2$).
2. All contained copper to cupric oxide (CuO).
3. All contained iron to ferric oxide ($Fe_2O_3$).
4. All other metal (M) sulfides into MO.

On this theoretical oxygen basis, high conversion of copper to the soluble form (water or acid) and minimum yield of soluble iron occur when the air supplied to a fluidized copper roasting bed is proportioned so that it is in excess but such excess does not exceed 400% over the stoichiometric value and preferably is of the order of 50%.

It is to be noted that irrespective of any theoretical oxygen limitations, fluidization itself imposes certain requirements on the space velocity (and therefore the volume) of the treatment gas supplied to a fluidized bed. By space velocity, which is a term common in the fluidization art, is meant the calculated velocity of the gases through the bed region as obtained by dividing the volume of gases per unit time evolved from the bed by the gross cross-sectional area occupied by the bed. Fluidization space velocities are known to range as low as 0.5 foot per second and as high as 15 feet per second. Thus to satisfy the theoretical oxygen requirements and the fluidization space velocity, it may be advisable to alter the composition of the treatment gas, by enriching fluidizing air with oxygen or, conversely, by diluting the air with the roaster exit gases or with inert gases such as nitrogen. Either practice is within the scope of the invention.

It is a feature of this invention to increase the degree of sulfating within the fluid bed by supplying sulfur-dioxide gas to the bed. This gas may be added from an outside source or it may be recycled from the reactor exit gases provided they contain sufficient sulfur-dioxide to aid in the reaction within the bed. Sulfur dioxide added in this manner serves a dual purpose in that it contributes to controlled sulfating conditions and at the same time serves as a part of the fluidizing gas in the bed and also as a means for controlling the relative oxygen content of the treatment gas. The added $SO_2$ gas may also be utilized as a temperature control means by using hot or cold $SO_2$ as desired.

In carrying out my fluidized treatment of copper bearing ores to attain a high copper sulfate calcine some difficulty has been encountered in maintaining constant conditions of fluidization within the bed. This difficulty has centered about the fact that certain ores tend to agglomerate at treatment conditions and to fuse into large non-fluidizable particles with the result that fluidization ceases and the reactor must be shut down. I have discovered that this difficulty in fluidization may be overcome if the copper content or the combined copper and zinc content of the feed is adjusted or maintained below a given maximum. Specifically, I have found that a copper concentrate containing more than about 25%–30% copper or copper and zinc combined cannot be successffully fluidized to yield high copper sulate over the entire range of operating temperatures due to the previously mentioned agglomeration. However, I have discovered I can overcome this difficulty by diluting the feed concentrate with an inert solid. That is to say, a solid having no copper or zinc and so inert in that respect. This inert material may be solids taken from the leaching dump which have had their copper content removed or they may be solids obtained from an outside source. The presence of zinc in the inerts is detrimental in this respect because it tends to behave in the same manner as the copper with respect to creating defluidization problems under conditions of high sulfating. In any event the quantity of solids to be added must be so regulated that the copper content of the feed is diluted to a point where agglomeration ceases and continuous fluidization can be maintained. Generally, this means diluting the copper content to a point below about 25%.

If desired, the diluent solids can be iron pyrites or some otherwise inert sulfide bearing material. It will be particularly advantageous to use a sulfide diluent in cases where the copper ore itself is low in sulfur such as is the case in chalcacite ore. In such cases the addition of the sulfide as a diluent serves the dual purpose of furnishing sulfur for attaining high sulfation of the copper while at the same time permitting continuous operation without danger of agglomeration and defluidization. Care should be taken that the solid diluent does not contain undesirable impurities which will interfere with subsequent electrolytic operations.

It is a feature of this invention then, that it is applicable to the sulfate roasting of copper concentrates having a copper content greater than about 25% by the expedient of diluting the feed material with inert solids.

In the drawings, Fig. 1 is a sectional partial perspective view of a suitable single bed roaster or reactor.

Figure 2:
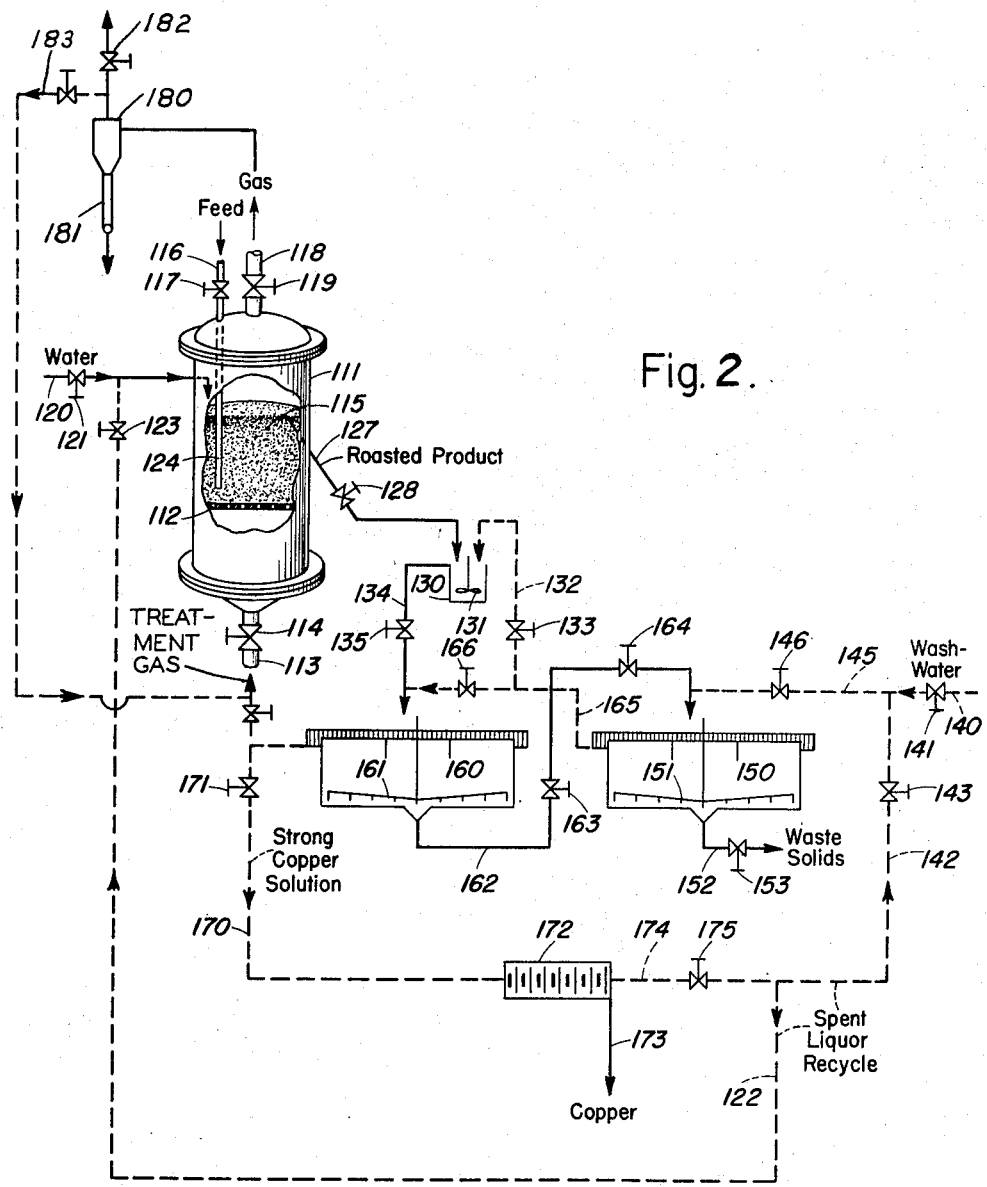

Figure 2 is a partial diagrammatic representation of a single bed reactor as in Fig. 1 in conjunction with a leaching circuit, electrolytic recovery of copper and return of a portion of spent electrolytic liquor to the reactor.

More particularly in the drawings:

In Fig. 1 is represented a single bed reactor collectively designated 11 which has side-wall members 12, a detachable top member 13 and a detachable bottom member 14. Internally, reactor 11 is lined with refractory material 15; horizontal constriction plate 30 having apertures 31 divides reactor 11 into a lower air-receiving section or windbox 32 and a fluidized bed zone 19. Feed solids in particle form enter hopper 16 and are conveyed thence into bed zone 19 within reactor 11 by means of screw 18 having casing 17. Fluidized roasting is maintained by supplying air or other free-oxygen bearing treatment gas under pressure to windbox 32 by means of conduit 33. From windbox 32, the treatment gas rises through the apertures 31 of constriction plate 30. In bed zone 19, the solids therein are fluidized and after treatment are discharged from the bed by flowing down conduit 20. Gas exiting from the fluidized bed flows out through conduit 21 and enters cyclone 23 where associated entrained fine solids or dust are removed from the gas; thereupon the gas is discharged through conduit 24. Dust separated in cyclone 23 may be removed therefrom by tail-pipe 26 which discharges into conduit 20. During roasting, the temperature in bed zone 19 may be held down to operable levels by means of a lean copper solution or other suitable coolant liquid supplied through conduit 40 and discharging through spray-head 41.

Flow rates of gases or solids through conduits 21, 24, 26, 40, 20 and 33 may be controlled by operation of their respective valves 22, 25, 27, 42, 28 and 34.

In starting up the process according to the plan of Fig. 1, air is first supplied to reactor 11 through conduit 33. Fuel is introduced into the reactor (by means not shown) and ignited. This is continued during the period that the reactor is coming up to an operating temperature. Thereupon, fine feed solids (i. e., at least as fine as minus 4 mesh on a Tyler standard screen) are supplied to the reactor 11 by screw 18. The air and gases rising up through the apertures 31 of constriction plate 30 fluidize the solids in bed zone 19 and also pre-heat them. When they are hot enough the sulfidic components therein combust and further supply of extraneous fuel is stopped. Gradually the level of fluidized solids builds up until it reaches the upper end of conduit 20; then treated solids leave the reactor by that conduit. As indicated above, when necessary, liquid coolant may be supplied to the reactor 11 through spray-head 41; or other means of cooling bed zone 19 may be employed, such as the use of conventional cooling coils. Gas bearing some entrained fine solids leaves the bed zone 19 and is conducted prior to discharge through conduit 24 through cyclone 23. Thereafter, operations are continued within the temperature and gas proportioning limits hereinbefore described.

Figure 2 represents a flow plan for treating sulfidic copper concentrate in a single fluidized bed, leaching the treated solids and recovering copper values therefrom, electrolytically precipitating copper from the resulting copper solutions and returning some spent cell liquor to the fluidized bed; thereby improving the overall efficiency of copper recovery.

Feed solids in particle form are supplied to the reactor collectively designated 111 by means of conduit 116 (having valve 117) which discharges below the surface level of fluidized bed 115. Treatment gas, predominately air, is supplied to the lower portion of reactor 111 through conduit 113; the rate thereof is regulated by valve 114. The treatment gas rises through apertured constriction plate 112 and after fluidizing the solids in bed 115, is conducted to discharge through conduit 118. This discharged gas is conducted to dust separator 180 where entrained dust is separated and discharged while the dust free gas is discharged via valved conduit 182 or recycled via valved conduit 183 to mix with the incoming treatment gas and so serve to regulate the oxygen content of that gas and, if the stack gas contains SO₂, then to aid in sulfation within the bed. If desired, a back-pressure may be maintained in reactor 111 by manipulation of valve 119. The solids roasted in bed 115, and with their copper values mainly in soluble form, are removed from bed 115 through conduit 127 which has valve 128; product solids enter agitator 130 wherein movement of paddle 131 mixes the product roasted solids with aqueous liquor supplied through conduit 132. Product solids and associated liquid leave agitator 130 through conduit 134 (having flow valve 135) and, together with further wash liquor supplied through conduit 165, enter thickener 160. In thickener 160, which is of known type such as a Dorr Thickener, the strong copper solution overflows the upper portion and is discharged through conduit 170; settled solids are raked to discharge through conduit 162 (having valves 163 and 164) by raking-mechanism 161. These settled solids are mixed with wash water plus recycled dilute copper solution, and sent to thickener 150 wherein the overflow liquid is recycled to either agitator 130 or thickener 160 by conduit 165. Raking-mechanism 151 impels the waste, settled solids to conduit 152 (having valve 153) and thence to discharge.

Referring to the strong copper solution conducted from thickener 160 by conduit 170, it may be separately used, concentrated by evaporation means (not shown) or sent to an electrical precipitation cell 172, thus yielding metallic copper 173 and a residual lean copper liquor. The lean copper liquor is conducted at a rate regulated by valves 175, 123, and 143 through conduit 174 either to spent liquor recycle conduit 122 or to its analog 142. In the latter event, the spent liquor joins with wash water supplied through conduit 140 (at a rate controlled by valve 141); the resulting mixed solution is conducted by valved conduit 145 to thickener 150. When the spent liquor or a portion of it is recycled through conduit 122, it is injected as a coolant for fluidized bed 115 within reactor 111; this may be supplemented or supplanted with water supplied through conduit 120 at a rate controlled by valve 121. By this copper solution recycling, not only is the temperature in bed 115 controlled but the overall copper recovery from the feed solids is enhanced. In addition, the possibility of making stronger copper solutions for treatment by electrolysis offers a means of lowering the electrical current requirements for that operation.

I am unable to fully explain the chemical mechanism of my invention because the results obtained do not conform to known equilibrium data and I do not wish the scope of this invention to be limited by purely theoretical discussions on the chemical mechanism involved. However, it may be theorized that the peculiar behavior of copper bearing sulfide ores under the particular solids fluidizing conditions of my invention is at least partly due to the presence of minor quantities of associated unidentifiable and otherwise inert materials which tend to cause deviation from the expected.

EXAMPLE I

In Table I there is compiled treatment conditions and some experimental results obtained when roasting a copper concentrate having the following proximate analysis:

Material:                                     Weight percent
    Copper ------------------------------------ 20
    Iron -------------------------------------- 36
    Zinc -------------------------------------- 1.5
    Sulfur ------------------------------------ 36
    Moisture --------------------------- Less than 1

Table I

| Temperature, °C. | Excess air, percent | Water-soluble copper, percent | Acid-soluble copper, percent | Insoluble copper, percent | Total soluble copper, percent |
|---|---|---|---|---|---|
| 625 | 100 | 87.6 | 11.9 | 0.5 | 99.5 |
| 625 | 11 | 44.5 | 49.9 | 5.6 | 94.4 |
| 670 | 46 | 98.5 | 1.0 | 0.5 | 99.5 |
| 700 | 50 | 82.3 | 16.1 | 1.6 | 98.4 |
| 725 | 50 | 41.4 | 57.5 | 1.1 | 98.9 |
| 750 | 50 | 23.4 | 58.0 | 18.6 | 81.4 |

It is to be noted that though wide variations are indicated in the ratio of water-soluble copper to acid-soluble copper from $$\frac{98.5}{1} \text{ to } \frac{23.4}{58.0}$$

the total soluble copper produced is very high; at 750° C. a significant diminution in total soluble copper becomes evident. Of course, to conduct an efficient leaching system, whether with water, acid or combinations thereof, it is essential that the total copper solubility be very high. Since practice of my invention accomplishes this result in a simple, flexible manner, its advantages are self-evident.

EXAMPLE II

In Table II there is compiled treatment conditions and some experimental results obtained when practicing the invention in an experimental reactor of 5 feet inside diameter.

The concentrate roasted had the following proximate analysis:

Material:                                     Weight percent
    Copper ------------------------------------ 23.7
    Iron -------------------------------------- 23.4
    Sulfur ------------------------------------ 32.5
    Other, including inerts and moisture -------- 20.4

Table II

| Temperature, °C. | Excess air, percent | Water-soluble copper, percent | Acid-soluble copper, percent | Insoluble copper, percent | Total soluble copper, percent |
|---|---|---|---|---|---|
| 710 | 80 | 70 | 26 | 4 | 96 |
| 680 | 95 | 87 | 10 | 3 | 97 |
| 680 | 35 | 83 | 13 | 4 | 96 |
| 730 | 35 | 22 | 73 | 5 | 95 |

Here are also demonstrated wide variations in the ratio of water soluble copper to acid soluble copper from 70/26 to 22/73 yet the total copper solubility remained high (95%–97%).

EXAMPLE III

Pilot plant roasts were conducted on a copper bearing ore having a very low sulfur content. The roasts were conducted to achieve maximum sulfating of the ore.

In the concentrate roasted, the sulfur was present principally in the form of chalcacite ($Cu_2S$) so there was only sufficient sulfur present to convert a maximum of one-half of the copper to copper sulfate ($CuSO_4$). In other words, the feed contained only 50% theoretical sulfur.

When roasted under solids fluidizing conditions at a temperature of about 580° C. using 75% excess air in the fluidizing gas, the resulting calcine contained only about 24.7% copper sulfate, the remaining sulfur having been absorbed by associated impurities. The stack gases from the roaster contained no measurable quantities of sulfur thus demonstrating that all of the sulfur was used up in the bed itself.

In subsequent tests on the same ore under the same conditions of temperature and excess air, the theoretical sulfur content available for the roast was increased to about 70%–75% by mixing with the oxygen bearing gas supplied to the bed sulfur dioxide gas in an amount sufficient to raise the available sulfur the desired 20–25%. The calcine obtained under these conditions contained about 44% water soluble copper thus demonstrating the efficiency of the roast because, as can be seen, the 20–25% increase in available sulfur resulted in a 20% increase in sulfated calcine.

I claim:

1. The continuous process for treating finely-divided copper bearing sulfide solids to yield a copper bearing calcine amenable to leaching for recovery of its copper content, comprising the steps of establishing an ever-changing single-bed single-stage solids treatment mass by supplying such solids to a treatment zone maintained at a temperature in the range from about 550° C. to about 750° C. while discharging from said zone a proportionate quantity of treated solids, maintaining said mass of solids as a turbulently mobilized homogeneous fluidized bed by passing a stream of free-oxygen bearing gas upwardly therethrough at solids fluidizing velocities, simultaneously forming in such fluidized bed both water-soluble copper compounds and water-insoluble acid-soluble copper compounds by supplying such free-oxygen in an amount at least equal to the theoretical oxygen required to substantially oxidize said feed solids to convert sulfur to sulfur dioxide and copper to copper oxide while converting other contained metals to metal oxides, and controlling the relative quantities of said copper compounds formed in said bed by varying the quantity of free-oxygen supplied thereto to lie in the range from at least equal to the above defined theoretical oxygen up to 400% in excess of such theoretical oxygen.

2. The continuous process for treating finely-divided copper bearing sulfide solids to yield a copper bearing calcine amenable to leaching for recovery of its copper content, comprising the steps of establishing an ever-changing single-bed single-stage solids treatment mass by supplying such solids to a treatment zone maintained at a temperature in the range from about 550° C. to about 750° C. while discharging from said zone a proportionate quantity of treated solids, maintaining said mass of solids as a turbulently mobilized homogeneous fluidized bed by passing a stream of free-oxygen bearing gas upwardly therethrough at solids fluidizing velocities, simultaneously forming in such fluidized bed both water-soluble copper compounds and water-insoluble acid-soluble copper compounds by supplying such free-oxygen in an amount in the range from at least equal to the theoretical oxygen required to substantially oxidize said feed solids to convert sulfur to sulfur dioxide and copper to copper oxide while converting other contained metals to metal oxides to 400% in excess of said theoretical oxygen requirement, and controlling the relative quantities of said copper compounds formed in said bed by varying the temperature in said treatment zone within the above stated range of 550° C. to 750° C.

References Cited in the file of this patent

UNITED STATES PATENTS

| Number | Name | Date |
|---|---|---|
| 1,376,025 | Middleton | Apr. 26, 1921 |
| 1,468,806 | Greenawalt | Sept. 25, 1923 |
| 1,478,790 | Middleton | Dec. 25, 1923 |
| 1,582,347 | Read et al. | Apr. 27, 1926 |
| 1,674,491 | Wetherbee | June 19, 1928 |
| 1,779,841 | Fischer | Oct. 28, 1930 |
| 1,922,490 | Miller et al. | Aug. 15, 1933 |
| 2,113,058 | Mullen | Apr. 5, 1938 |
| 2,209,331 | Haglund | July 30, 1940 |
| 2,227,783 | Klumpp | Jan. 7, 1941 |
| 2,440,612 | Lichtenwalter | Apr. 27, 1948 |
| 2,522,576 | Ingraham | Sept. 12, 1950 |

OTHER REFERENCES

"Chemical Engineering," pages 112–115, December 1947.